Aug. 27, 1968          M. H. WOLFBAUER, JR          3,398,533
                CLOSED AIR COMPRESSOR AND MOTOR SYSTEM
Filed Nov. 13, 1961                              2 Sheets-Sheet 1

INVENTOR.
MICHAEL H. WOLFBAUER
BY
William L Fisher
ATTORNEY

Aug. 27, 1968   M. H. WOLFBAUER, JR   3,398,533
CLOSED AIR COMPRESSOR AND MOTOR SYSTEM

Filed Nov. 13, 1961   2 Sheets-Sheet 2

INVENTOR.
MICHAEL H. WOLFBAUER
BY
William L. Fisher
ATTORNEY

United States Patent Office 3,398,533
Patented Aug. 27, 1968

3,398,533
CLOSED AIR COMPRESSOR AND
MOTOR SYSTEM
Michael H. Wolfbauer, Jr., 20455 Woodland,
Harper Woods, Mich. 48236
Filed Nov. 13, 1961, Ser. No. 161,759
1 Claim. (Cl. 60—57)

This invention relates to improvements both in process and in means in air pressure supply systems particularly for air-operated resistance welding guns.

Heretofore in the supply of air pressure for pneumatic components of machines such as welding guns a central header system has been the rule because individual air pressure supply units have been generally unsatisfactory. This is in contrast to hydraulic power sources where the rule has been individual supply units rather than a central system. However, air is cheaper and safer than oil and far less troublesome as a power source, provided the requisite pressure and recovery can be supplied and the presently known disadvantages attendant with air overcome in individual air pressure supply units which is the object of the means and method of the present invention.

Whether a central header system or individual units are employed as air power sources for resistance welding guns there are disadvantages connected with them, among which are, the noise attendant the exhaust of air at the multi-way valve controlling the air cylinder. In welding, a three-way or a four-way valve is employed for controlling the pressure and exhaust air to and from the welding gun and mufflers are usually installed in the lines exhausting from the multi-way valve to cut down on the noise. Also it is standard to incorporate a lubricator in the air pressure line leading to the multi-way valve to lubricate both the valve and the welding gun. Thus the exhaust air from the multi-way valve is entrained with oil which presents a health hazard for workmen around the machine.

The object of the present invention is to provide improvements both in process and means in individual air pressure supply systems for welding guns which overcome the foregoing disadvantages and which effect other substantial and significant advances in this art, all of which will become apparent during the course of the following description taken in conjunction with the accompanying drawings.

Figure 1:
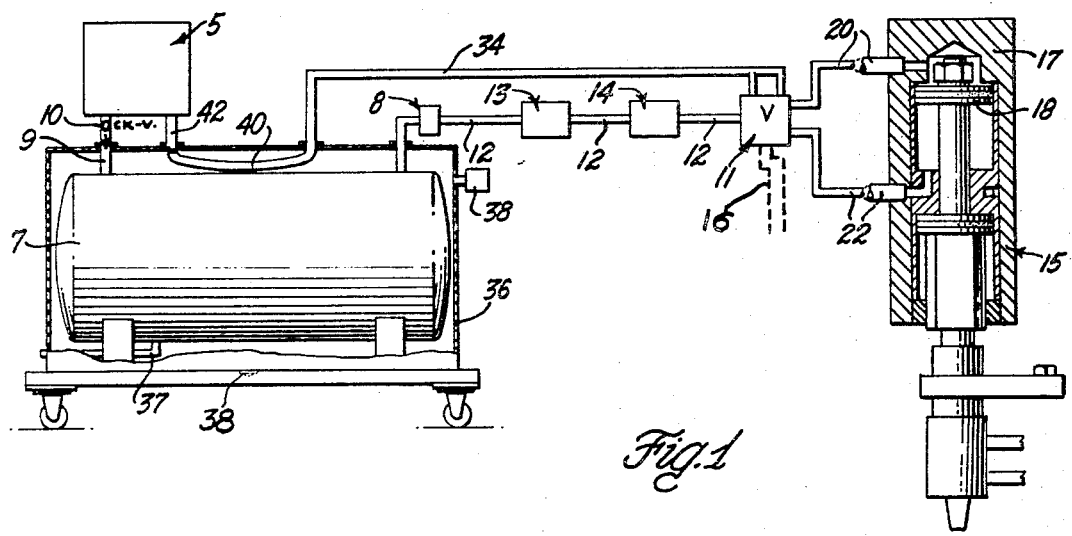
FIG. 1 is a schematic diagram of an air pressure supply system embodying the present invention.

Referring to the drawings in greater detail and first to the schematic diagram of FIG. 1, 5 indicates an air compressor unit which supplies pressure air to a pressure receiver or tank 7 with drain 37 by conduit means 9 which includes a ball check valve 10 opening against pressure air supplied by the compressor 5. The pressure tank 7 stores large quantities of pressure air to be available for use in the system which it supplies to a multi-way valve 11 by conduit means 12. Incorporated in the conduit means 12 is a pressure regulator 8, an air filter 13, and a lubricator 14 for lubricating both the multi-way valve 11 and the work device 15 which it controls. In practice in prior art systems the multi-way valve is always well lubricated and the work device poorly lubricated. In the instance shown the multi-way valve 11 is a solenoid-operated four-way valve which directs the cycle of operation of the work device 15 from impulses received in the electrical lines 16. The work device is a cylinder 17 and piston 18 air operated double-acting welding gun which alternately receives pressure air in the pair of conduit means 20 and 22 in accordance with the pre-determined work cycle for the welding gun. When, for example, pressure air received from the conduit means 12 in the inlet port 23 of the multi-way valve 11 is directed to the supply port 25 and the conduit means 20 by the multi-way valve in the power stroke of the piston 18, the exhaust air from the welding gun is directed back to the other supply port 27 of the multi-way valve through conduit means 22 and thence discharged through the exhaust port 29 of the multi-way valve. Conversely when pressure air is directed to the multi-way valve supply port 27 and the conduit means 22 in the return stroke of the piston, the exhaust air from the welding gun is directed back to the other supply port 25 of the multi-way valve through conduit means 20 and thence discharged through the other exhaust port 31 of the multi-way valve.

The foregoing is entirely conventional and it is at this point that the prior art and the present invention part. In the prior art the air exhaused alternately from the ports 29 and 31 of the four-way valve is discharged into the atmosphere. Where a three-way valve is employed with a spring return piston there is only one exhaust port on the multi-way valve and in this case also in the prior art the exhaust air from the three-way valve is discharged into the atmosphere. The exhaust air discharges from the multi-way valve with considerable pressure and a good deal of noise which in the past had to be muffled because of objections from men working near such units. Also the discharging exhaust air entrains a good deal of oil which fills the air to the extent of creating a health hazard for workmen and in addition deposits films of oil all over the machinery, the walls and anything which remains for any length of time near the multi-way valve. When it is considered that for each welding gun there is a multi-way valve discharging such oil-entrained exhaust air into the atmopshere on each piston stroke the problem and hazards involved can be appreciated.

In accordance with the present invention conduit means 34 is provided to capture the exhaust air from the multi-way valve 11 and recirculate it through the system by means of an exhaust air receiver or tank 36 which is constructed to house for safety the pressure tank 7 so as to permit its fabrication with smaller safety factors for any given pressure. The exhaust air receiver 36 is provided with a drain 39 for eliminating any water that might be entrained in the substantially closed system and a filter and pressure regulator 38 that may be eliminated in order that there be no back pressure on the work device 15 which is most usually desired and so that the exhaust air receiver 36 can freely admit or exit a small quantity of air to maintain the exhaust air supply in the exhaust air receiver 36 at atmospheric pressure. The system is further provided with conduit means 40 which directs the exhaust air from the conduit means 34 into the intake 42 for the air compressor 5 directly but without positive physical connection, as shown. Alternatively, if a physical connection is made between the intake 42 and the conduit means 40 then the latter must communicate with the exhaust air receiver 36 which can be accomplished by providing apertures in the conduit means 40 near the direct connection to the intake 42. In this way the exhaust air under its own discharge pressure forces its way into the compressor intake 42 in aid of the compression when the compressor is functioning to supply the pressure tank 7. By the improvements in both process and means described, the recirculated air eventually but thoroughly lubricates all parts in the system through which both the pressure air and exhaust air travel in the substantially closed loop. The operation of the system is silent, trouble-free and safe.

Figure 2:
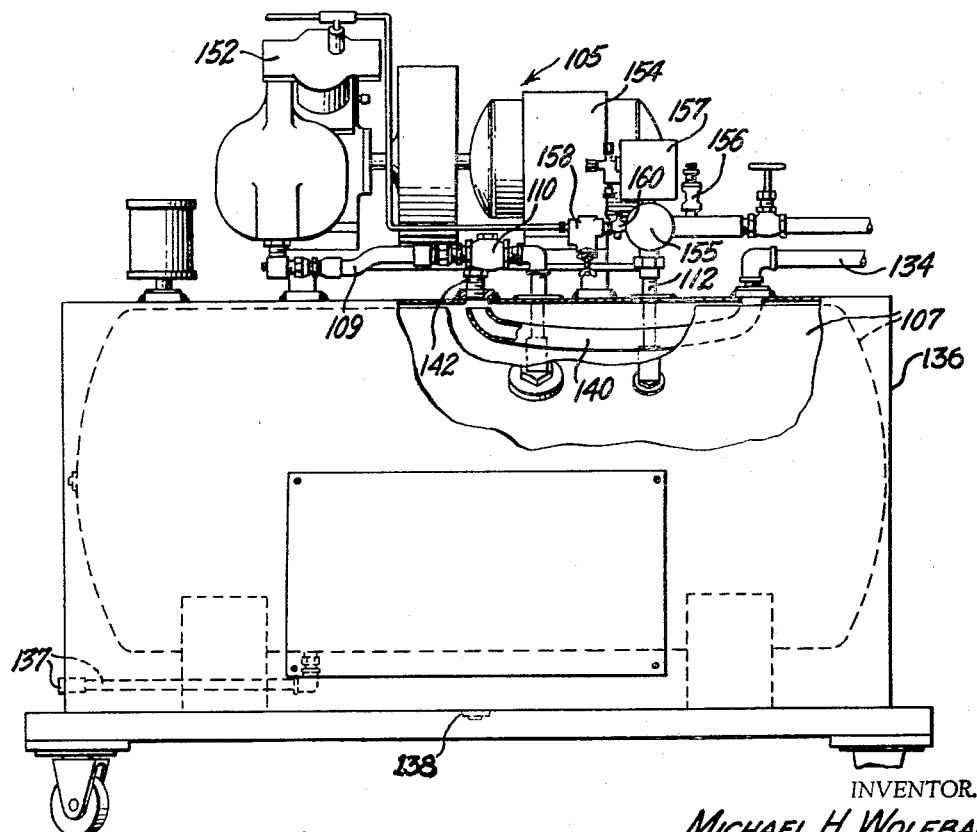
FIGS. 2, 3 and 4 are elevation, plan and end views, respectively, of an individual air pressure supply unit for use in the system embodying the present invention.
Figure 3:
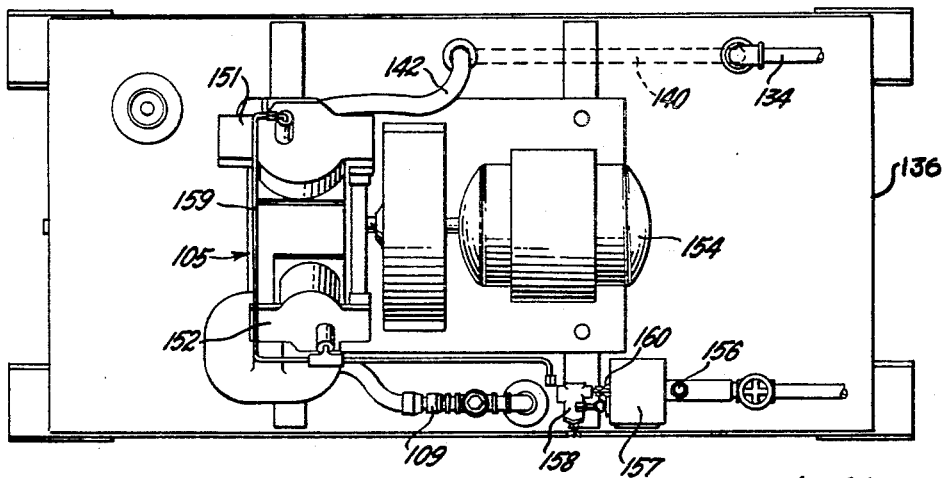
Figure 4:
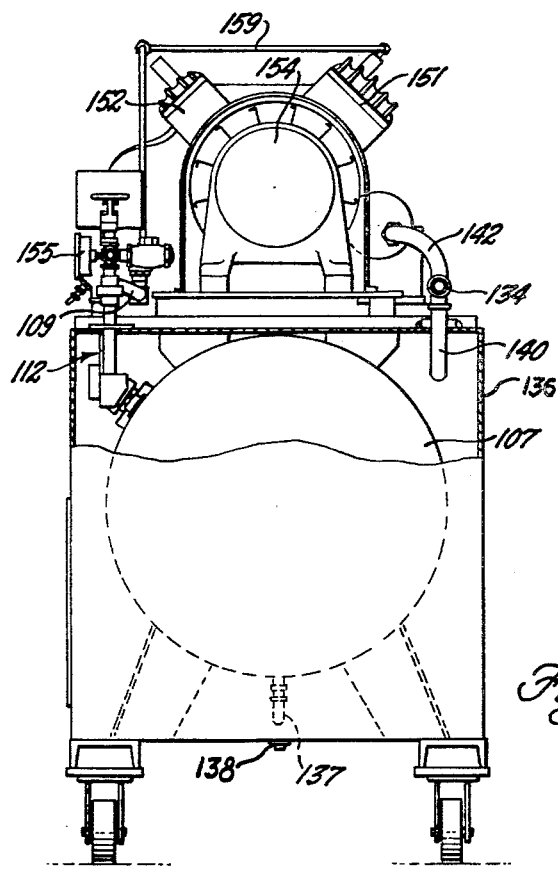
Figure 5:
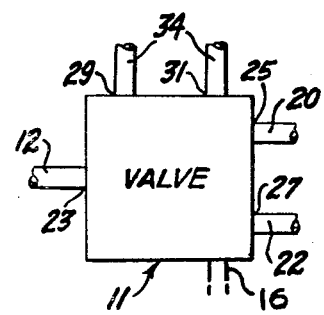
FIG. 5 is an enlarged view of the valve 11 in FIG. 1.

FIGS. 2–4 show a commercial embodiment of an air pressure supply unit for use in the foregoing system which comprises a compressor 105 having first 151 and second 152 stages driven by a 3-phase electric motor 154. The compressor 105 supplies pressure air to a pressure receiver or tank 107 by conduit means 109 which includes an air check valve 110. The pressure tank 107 supplies pressure air to the multi-way valve of the previously described system by conduit means 112 which includes a pressure gage 155 and safety valve 156. The air filter and lubricator in the system above described are usually carried in the welding line. A pressure switch 157 may be included for controlling the start and stop of the compressor motor or it may instead by the shut-off valve 160 be subject to the control 158 and by-pass 159 which opens the valves in the compressor heads permitting the motor to run idle until the tank pressure drops below a predetermined pressure at which time the head valves are closed and the compressor again runs under load.

The captured exhaust air from the work device and multi-way valve is directed to conduit means 134 on the unit and recirculated through the system by means of the exhaust air receiver 136 which, as shown, encompasses the pressure tank 107 and is provided with a drain 139. 161 is the sediment drain for the pressure air receiver 107. Conduit means 140 is provided as shown which directs the exhaust air from the conduit means 134 into the intake 142 of the air compressor 105 as above described.

It will thus be seen that there has been provided by the present invention improvements in both process and means in air pressure supply systems particularly for air operated welding guns in which a unitary air supply unit is provided and in which the object heretofore set forth together with many thoroughly practical advantages is successfully achieved.

What is claimed is:

1. In an air pressure supply system for air-operated welding guns and the like work-devices which are controlled by multi-way valves, the improvement comprising an air compressor, a pressure receiver for storing compressed air and an exhaust receiver for storing exhaust air all mounted together in a unitary arrangement which is essentially portable by which pressure air may be made in situ at the welding machine in lieu of transporting plant air great distances, said arrangement comprising means for collecting the exhaust air from the multi-way valves to store in the exhaust receiver and for conveying the air collected in the exhaust receiver into the intake of the air compressor whereby the system is substantially closed so that discharge of exhaust air into the atmosphere is eliminated, the arrangement characterized in that the exhaust receiver serves as a mount for the compressor and houses the pressure receiver in close fitting enclosing relation to save space and for safety, the two receivers being air storage tanks having substantially the same order of air storage capacity.

References Cited

UNITED STATES PATENTS

| | | | |
|---|---|---|---|
| 2,054,570 | 9/1936 | Burt | 60—62 |
| 3,023,578 | 3/1962 | Hendry | 60—51 |
| 2,382,437 | 8/1945 | Molly | 60—51 X |
| 2,475,701 | 7/1949 | Eaton | 60—62 |
| 3,028,732 | 4/1962 | Shampaine et al. | 60—51 |

FOREIGN PATENTS 216,148  10/1924  Great Britain.

JULIUS E. WEST, *Primary Examiner.*